(12) United States Patent
McMillan, Jr. et al.

(10) Patent No.: US 12,682,054 B2
(45) Date of Patent: Jul. 14, 2026

(54) ANOMALOUS FILE DETECTION

(71) Applicant: Index Engines Inc., Holmdel, NJ (US)

(72) Inventors: Ben Henry McMillan, Jr., Middletown, NJ (US); Jairo Orlando Esteban, Freehold, NJ (US)

(73) Assignee: Index Engines Inc., Holmdel, NJ (US)

( * ) Notice: Subject to any disclaimer, the term of this patent is extended or adjusted under 35 U.S.C. 154(b) by 0 days.

(21) Appl. No.: 18/943,140

(22) Filed: Nov. 11, 2024

(65) Prior Publication Data

US 2026/0134093 A1      May 14, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
USPC .......................................................... 726/23
See application file for complete search history.

(56) References Cited

U.S. PATENT DOCUMENTS

| | | | | |
|---|---|---|---|---|
| 10,089,467 B1 * | 10/2018 | Hartnett | | G06N 20/00 |
| 10,956,568 B2 * | 3/2021 | Fralick | | G06F 21/566 |
| 11,093,519 B2 * | 8/2021 | Venkatesan | | G06F 16/254 |
| 11,308,208 B2 * | 4/2022 | Mager | | G06F 21/554 |
| 11,755,725 B2 * | 9/2023 | Ruikar | | G06F 21/552 |
| | | | | 726/23 |

| | | | | |
|---|---|---|---|---|
| 11,768,936 B2 * | 9/2023 | Herman Saffar | ..... | G06F 21/565 |
| | | | | 726/23 |
| 11,792,215 B1 * | 10/2023 | Atay | .................. | G06F 11/3452 |
| | | | | 726/23 |
| 11,799,898 B2 * | 10/2023 | Humphrey | .......... | H04L 63/1441 |
| 11,973,672 B2 * | 4/2024 | Lee | ..................... | G06F 18/2155 |
| 2018/0024893 A1 | 1/2018 | Sella et al. | | |
| 2018/0097826 A1 * | 4/2018 | Luan | .................. | H04L 63/1416 |
| 2018/0121673 A1 * | 5/2018 | Goldfarb | ............ | G06F 16/9024 |
| 2019/0012460 A1 * | 1/2019 | Hartnett | ................ | G06F 21/566 |
| 2019/0354388 A1 * | 11/2019 | Mitra | .................... | G06F 21/566 |
| 2021/0234880 A1 * | 7/2021 | McLane | .............. | H04L 63/1425 |
| 2021/0273950 A1 * | 9/2021 | Lawson | ................. | H04L 63/20 |
| 2021/0350002 A1 * | 11/2021 | Hajost | ..................... | G06F 21/57 |
| 2022/0058261 A1 * | 2/2022 | Lopatin | ................ | G06F 18/241 |
| 2022/0067146 A1 * | 3/2022 | Cai | ....................... | G06F 21/566 |
| 2022/0413956 A1 * | 12/2022 | Mathew | ............... | G06F 9/5016 |

(Continued)

OTHER PUBLICATIONS

Federal Trade Commission, "Consumer Advice—Malware: How to Protect Against, Detect and Remove It", https://consumer.ftc.gov/node/78347, accessed Jan. 11, 2026, 4 pages.

(Continued)

*Primary Examiner* — Taghi T Arani
*Assistant Examiner* — Pegah Barzegar
(74) *Attorney, Agent, or Firm* — Merchant & Gould P.C.

(57) ABSTRACT

Systems and methods are provided for detecting an anomalous file in a dataset of files utilizing a set of computer resources executing instructions to establish computer processes. The computer processes include, for each file in the dataset, evaluating the file to produce a file profile, using the file profile to develop a score for the file as to its specific type, and processing the score in a machine learning model trained on anomalous file data to generate a probability that the file has an anomaly for the specific type.

8 Claims, 12 Drawing Sheets

100

(56) References Cited

U.S. PATENT DOCUMENTS

| | | | | |
|---|---|---|---|---|
| 2023/0012220 A1* | 1/2023 | Humphrey | .............. | H04L 41/16 |
| 2023/0359519 A9* | 11/2023 | Poole | .................... | C22C 38/001 |
| 2023/0418942 A1* | 12/2023 | Lovmand | .............. | G06F 21/552 |
| 2024/0248963 A1* | 7/2024 | Parham | .............. | G06F 18/2415 |

OTHER PUBLICATIONS

International Searching Authority—International Search Report, pertaining to International Application No. PCT/US2025/054785 dated Mar. 16, 2026, together with the Written Opinion of the International Searching Authority, 11 pages.
Lee et al. "Machine Learning Based File Entropy Analysis for Ransomware Detection in Backup Systems", IEEE Access, Special Section on AI in Cybersecurity, vol. 7, Aug. 22, 2019.

* cited by examiner

ANOMALOUS FILE DETECTION

TECHNICAL FIELD

The present invention relates to anomaly detection, and more particularly to a system and method for anomaly detection in file contents by comparing with benchmarks.

BACKGROUND ART

Anomaly detection in a dataset is a process that identifies a pattern in the dataset that differs from the expected. Anomaly detection is used in many fields, including cyber-security, finance, healthcare, and manufacturing to assure that the dataset is reliable or to identify a risk associated with fraud or a system malfunction that involves a potential data breach or other circumstance that might lead to financial loss.

Detection of anomalous files and anomalies inside files facilitates the identification of suspect behavior of entire systems of which they are part. Such detection can include categorizing a file or its contents (collectively, a "dataset") as "normal" or "abnormal." Generally, "abnormal" refers to a dataset having a pattern that differs from what is expected, whereas "normal" refers to a dataset having a pattern that is expected. The definitions of "expected," "normal," and their counterparts are specific to a given domain. For example, when monitoring a system to determine if it is under a ransomware attack, abnormal files might well have been encrypted during the attack, hindering a proper file catego-rization to detect the ransomware attack. There is a need to improve anomaly detection to identify anomalies, such as resulting from a ransomware attack, more effectively.

SUMMARY OF EMBODIMENTS

In various implementations, systems and methods are provided for detecting an anomalous file in a dataset of files utilizing a set of computer resources executing instructions to establish computer processes. The computer processes include, for each file in the dataset, evaluating the file to produce a file profile, using the file profile to develop a score for the file as to its specific type, and processing the score in a machine learning model trained on anomalous file data to generate a probability that the file has an anomaly for the specific type. Using the file profile to develop a score for the file as to its specific type includes comparing the file profile against a benchmark for its specific type, wherein the benchmark has been developed based on data for a selected collection of files of the specific file type. The particular constituents of the set of metrics used in determining the file profile depend on the domain involved—namely, on the context in which the files are being used or have been generated.

In one example, the benchmark is selected from the group consisting of an average entropy of the file, a most common symbol in the file, average frequency of occurrence of the most common symbol in the file, an entropy variance, and combinations of the foregoing. In some implementations, evaluating the file may include scanning and using metadata of the file to generate at least one metric to compare against the benchmark.

In some implementations, using the file profile to develop the score may include producing a collection of values from comparing the file profile and the benchmark to define the score. The score may be selected from the group consisting of a percentage difference between a size of the file and an average size of a benchmark, a percentile ranking between the size of the file and the benchmark, a difference between an entropy of the file and a benchmark entropy, and com-binations of the foregoing. The machine learning model may be selected from the group consisting of a decision tree, a random forest, a neural network, a gradient boosting learn-ing model, and combinations of the foregoing.

In some implementations, processing the score in the machine learning model may include processing the score trained on both files deemed normal and files deemed compromised. In some implementations, processing the score in the machine learning model may include determin-ing, using the probability, whether the file has the anomaly for the specific type. In some implementations, processing the score in the machine learning model may include deter-mining whether the file has been corrupted by ransomware.

BRIEF DESCRIPTION OF THE DRAWINGS

The foregoing features of implementations will be more readily understood by reference to the following detailed description, taken with reference to the accompanying draw-ings, in which.

DETAILED DESCRIPTION OF SPECIFIC IMPLEMENTATIONS

Figure 1:
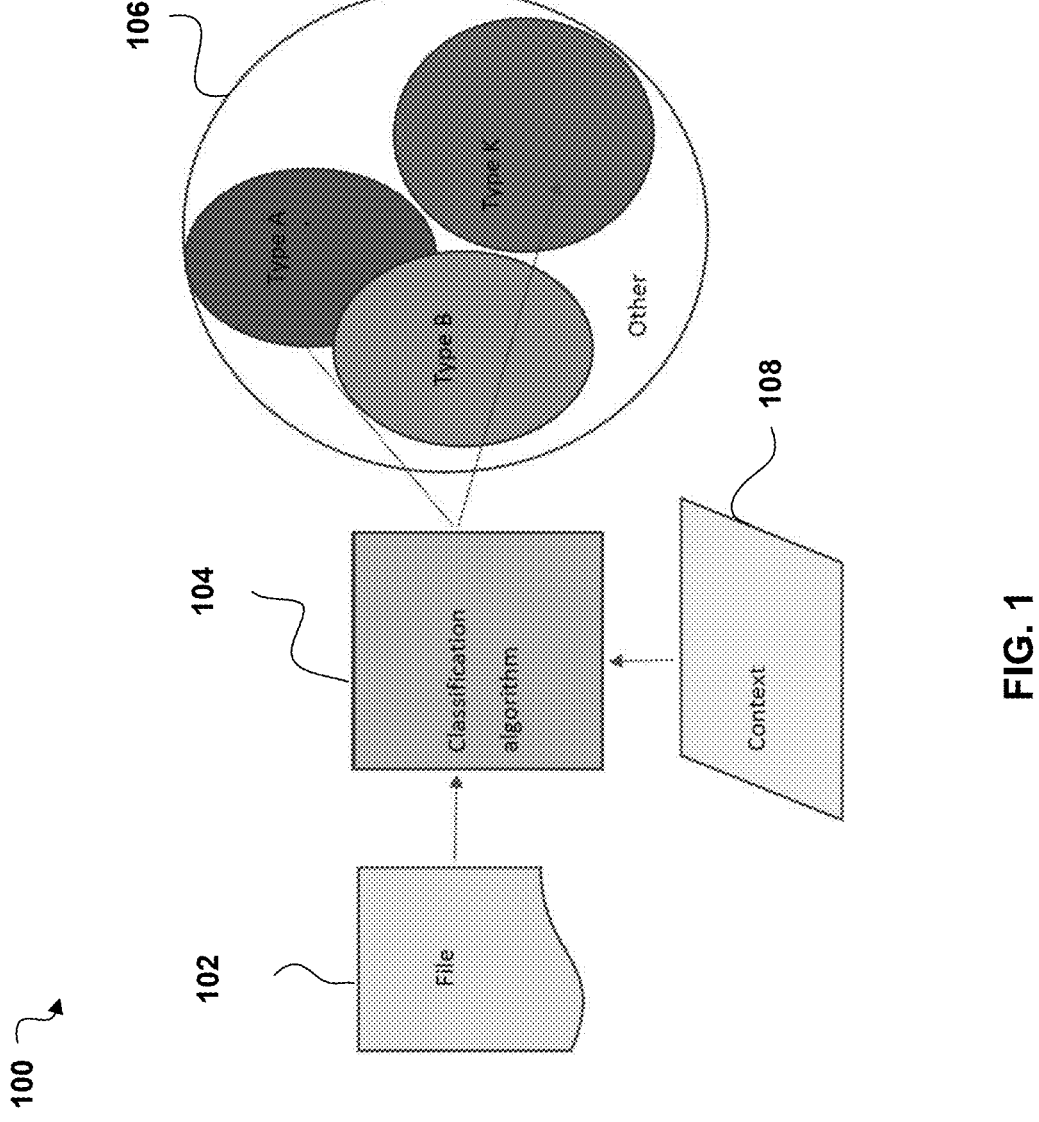
FIG. 1 is a logical flow diagram of an example of a process for classifying file types, in accordance with an implementation of the present invention.

Definitions. As used in this description and the accompanying claims, the following terms shall have the meanings indicated, unless the context otherwise requires:

A "set" includes at least one member.

The singular forms "a," "an," and "the" include the plural forms as well. Thus, reference to a device in the singular (e.g., "a device," "the device"), including in the claims, includes implementations with one device and implementations with more than one of such devices. (For example, "a processor" includes implementations with one processor and implementations with more than one processor; "the processor" includes implementations with one processor and implementations with more than processor; "a memory" includes implementations with one memory and implementations with more than one memory; "the memory" includes implementations with one memory and implementations with more than memory, etc.)

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process," we do not necessarily require a schedulable entity, or operation of a computer program or a part thereof, although, in some implementations, a computer process may be implemented by such a schedulable entity, or operation of a computer program or a part thereof. Furthermore, unless the context otherwise requires, a "process" may be implemented using more than one processor or more than one (single- or multi-processor) computer.

A "benchmark" is a set of metrics, associated with a file type, that uniquely identifies a file of the associated type in a dataset of files being analyzed for anomalies, so that each file type is characterized by a corresponding benchmark. The particular constituents of the set of metrics used for determining the benchmark are selected based on a context (in other words, the domain) in which the dataset of files is being used or has been generated. The benchmark is developed based on data for a selected collection of files of the specific file type.

A "file profile" is a set of metrics, associated with a given file, that can be compared against the set of metrics of a selected benchmark for the purpose of determining whether the given file is of a type associated with the selected benchmark. The particular constituents of the set of metrics used in determining the file profile depends on the domain involved—namely, on the context in which the files are being used or have been generated A "file score" is a set of metrics, associated with a given file, resulting from a comparison of the file profile of the given file against a selected benchmark. In implementations of the present invention, the file score provides an item of raw data for use in a machine learning model configured to effectively identify anomalies in individual files.

A "machine learning model" is an object, stored locally in a file, that has been trained via an algorithm, on what are typically large quantities of training data, to recognize patterns in similar kinds of data and to make predictions about such data.

In various implementations, the present invention identifies a corrupt file in a file system. A corrupt file can be the result of a deliberate action such as a ransomware attack, or an accidental event such as physical damage to a storage device. In such a case, the integrity of a file may be compromised. It may be possible to identify a corrupt file using a manual method, such as, for instance, verifying if the file can be opened by its associated application. Such an approach may be not only expensive, but also ineffective, since a file may not be able to be verified, owing to lack of an associated application or a complex set of dependencies. An automated approach, on the other hand, presents an opportunity for identifying, with an elevated success rate, a file having corrupt or compromised content.

Implementations of the present invention utilize a series of core ideas including:

File types: Based on the problem's domain, define types by which files can be classified.

Benchmarks: For files of each defined file type, examine file profiles of these files to build a benchmark that represents what is normal (i.e, expected) for files of the defined type For each file of each defined file type, determine a file score by comparing its file profile with the benchmark for the defined file type Classify a file as anomalous when, after its file score has been fed to a pre-trained model to produce a numeric score representing the probability that the file is anomalous, and the probability is sufficiently high Implementations utilizing these core ideas can produce advantages including:

Activation time: Compared with methods that need to observe behavior patterns during extended periods of time to identify normal cases, this approach can start giving results immediately after being implemented.

Adaptability to multiple domains: File types are defined for the specific problem domain.

Parallelization: When multiple computing resources are available, it is possible to examine multiple files simultaneously, as well as comparing a file against multiple benchmarks Personalization: File types and benchmarks can be general for an industry or specific to a site, providing an adaptable mechanism Dealing with ambiguity: Various of these implementations support cases where file types cannot be identified with complete certainty.

In various implementations, the present invention provides a computer-based system and method for detecting an anomalous file within a file dataset. For each file in the dataset, the system and method include evaluating the file using a classification algorithm, a benchmark builder algorithm, and a file profiler. Initially, for the dataset, the benchmark builder generates a benchmark for each file type, with the benchmark constituting a set of metrics characterizing what is expected (that is, what is normal) for the specific file type. Thereafter, the classification algorithm identifies and categorizes each file according to its file type. The file profiler processes each file on a generic basis (that is, without regard to file type) to use the file's metadata and file contents to generate a set of metrics (called a "file profile") that can be used thereafter for comparison against a benchmark.

After a file profile has been generated for a given file, then a Scorer compares the file profile against a benchmark and generates a collection of file scores reflecting deviation in the file profile from the benchmark with respect to metrics deemed pertinent to the context, such as (for example) file size versus average file size, percentile as to file size, and variances in relation to the benchmark average entropy and white space count.

In turn, the file scores are fed into a machine learning system, using a predictor algorithm and trained on anomalous file data, to generate a probability that the file has an anomaly for its specific type. Based on this probability, the file is identified as being compromised or normal.

File types and Classification algorithm. FIG. 1 is a logical flow diagram of an example of a process 100 for classifying file types, in accordance with an implementation of the present invention. Process 100 utilizes classification algorithm 104 receiving a file 102 of a specific file type and context information 108 regarding certain system-specific files as input. Classification algorithm 104 may classify the files into file types 106 for a given domain. There are K file types 106, marked here as including file types A, B, etc. up to file type K. For completeness, we provide an additional file type that we call "Other." This example illustrates the following regarding file type 106:

There is an arbitrary number of file types;
Type sizes might not be uniform;
It is possible to have overlapping types;
A file can be classified in multiple types.
The classification algorithm can have context as input, which might alter its output in specific cases. For example, it can run a generic algorithm in most cases but identify a specific type only for certain files in one site.
Additionally, as to file types, it should be noted that in various implementations:
Types can be defined by a domain expert, or by an automated process. For instance, a K-Nearest Neighbors (KNN) classification model.
The classification algorithm can assign probabilities for target types, in case of uncertainty.
Types can be added or removed dynamically. The classification algorithm must be updated accordingly.
Benchmarks and Benchmark Builder. For each file type, there must exist a profile (that is, a benchmark), which can be described as a collection of statistics that uniquely identify the type. Benchmarks are the mechanism used by implementations of this invention for identifying normal files using numeric representations of internal and external features. For instance, a benchmark can have some of the following features:
File size: Min, max, average, standard deviation, etc.
File entropy: Min, max, average, standard deviation, etc.
Number of whitespaces: average, standard deviation
Notice that features can be a mixture of metadata (for instance: file size, file name length) and internal data (for instance: file entropy). Benchmarks can be created manually by a domain expert or computed by an algorithm using sample files as input and can be updated as more samples of files are available. One advantage of using benchmarks is that individual files can be scored by comparing them against an existing standard, which facilitates a fast activation of the approach and eliminates the need of preserving previous copies of the files, as opposed to an approach requiring a training period for observing normal behavior.

Figure 2:
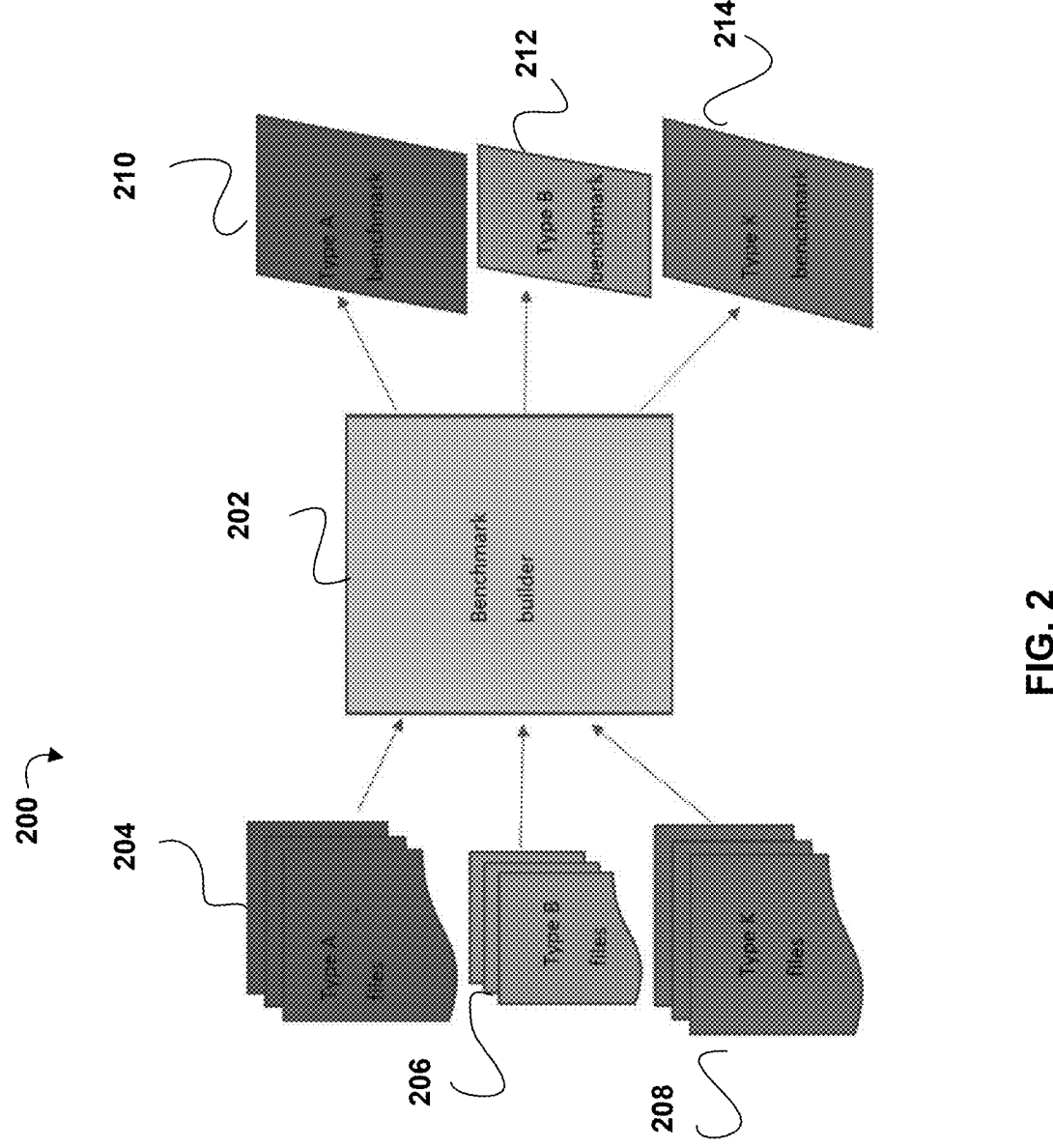
FIG. 2 is a logical flow diagram of an example of a benchmark builder, in accordance with an implementation of the present invention.

FIG. 2 is a logical flow diagram of an example of a benchmark builder 202, in accordance with an implementation of the present invention, for computing file type benchmarks. A Benchmark builder process takes sample files for a given type as input, and produces a set of statistics, which becomes the type's benchmark. Thus benchmark builder 202 receives as an input a collection of files 204, 206, . . . 208 with file types A, B, . . . K. For each file type A, B, . . . K, the benchmark builder 202 creates a corresponding benchmark 210, 212, . . . 214 to uniquely identify the file type.

File score. The file score is a collection of values that result from comparing values computed for an individual file against a particular benchmark. File score is the mechanism used by implementations of this invention to represent a file as a collection of numeric values, summarizing its contents and metadata. The file score provides raw data that can be used by a model to identify anomalies in individual files.

Figure 3:
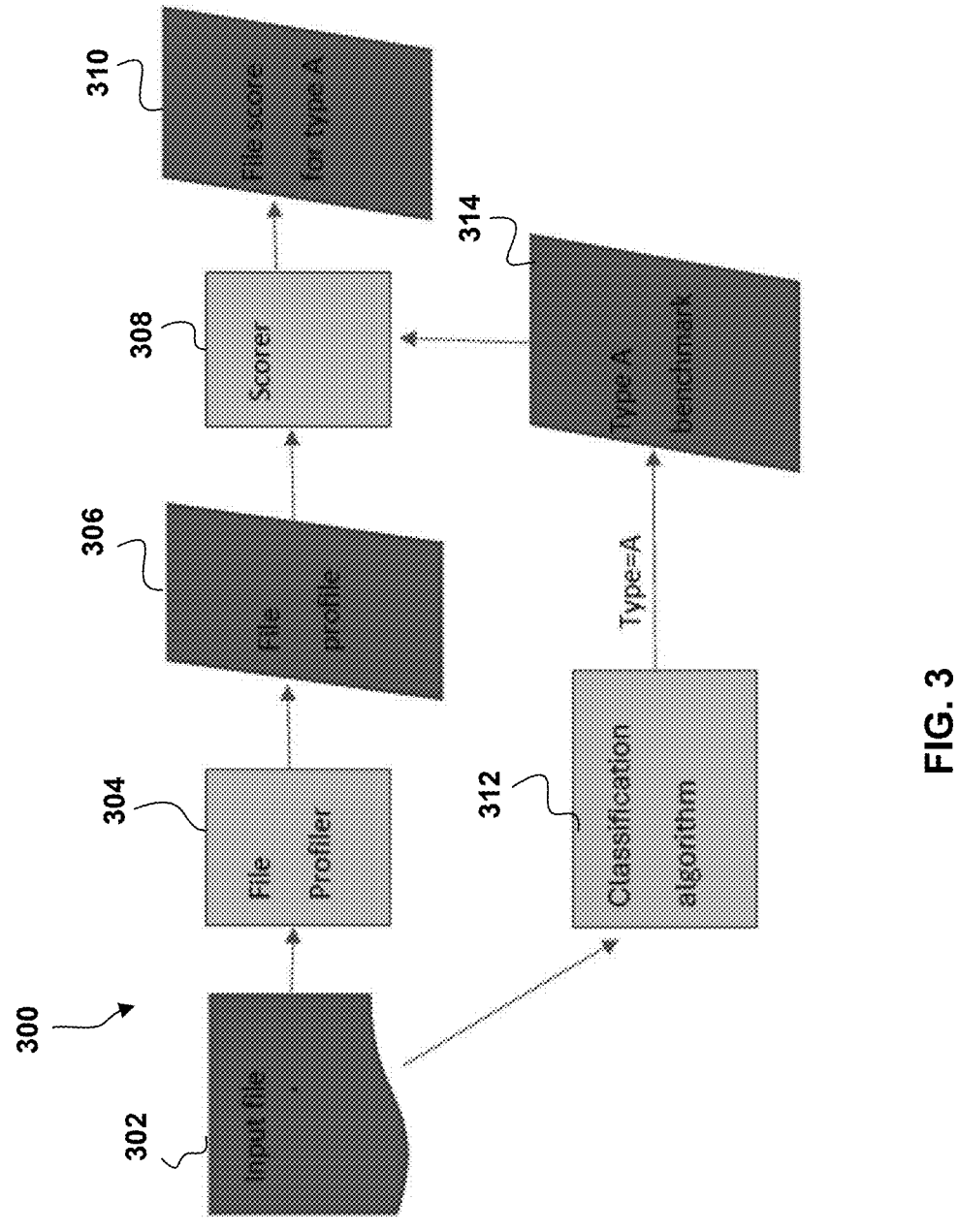
FIG. 3 is a logical flow diagram of an example of an automated process for generating a file score for a file, in accordance with an implementation of the present invention.

FIG. 3 is a logical flow diagram of an example of an automated process 300 for generating as an output a file score 310 for a single file input 302 of a single type A, in accordance with an implementation of the present invention. This example illustrates the following:

The input file 302 is sent to a File Profiler 304, which is configured to perform a set of generic processes (i.e., processes agnostic of file type), including scanning the input file 302 and using input file's metadata to generate metrics, in the form of file profile 306, that can be used next to compare against a benchmark 314.

The file profile 306 is sent to Scorer 308. The Scorer 308 also receives as an input the benchmark 314, which is determined based on classification of the input file 302 by the classification algorithm 312. The Scorer 308 performs a process that compares the file profile 306 against the benchmark 314 and generates a collection of values constituting the file score 310 for the input file 302.

The file profile 306 is temporary by nature. Therefore, it can be discarded once the file score 310 has been computed. However, it can also be stored for future use or for accelerating re-computation.

Figure 4:
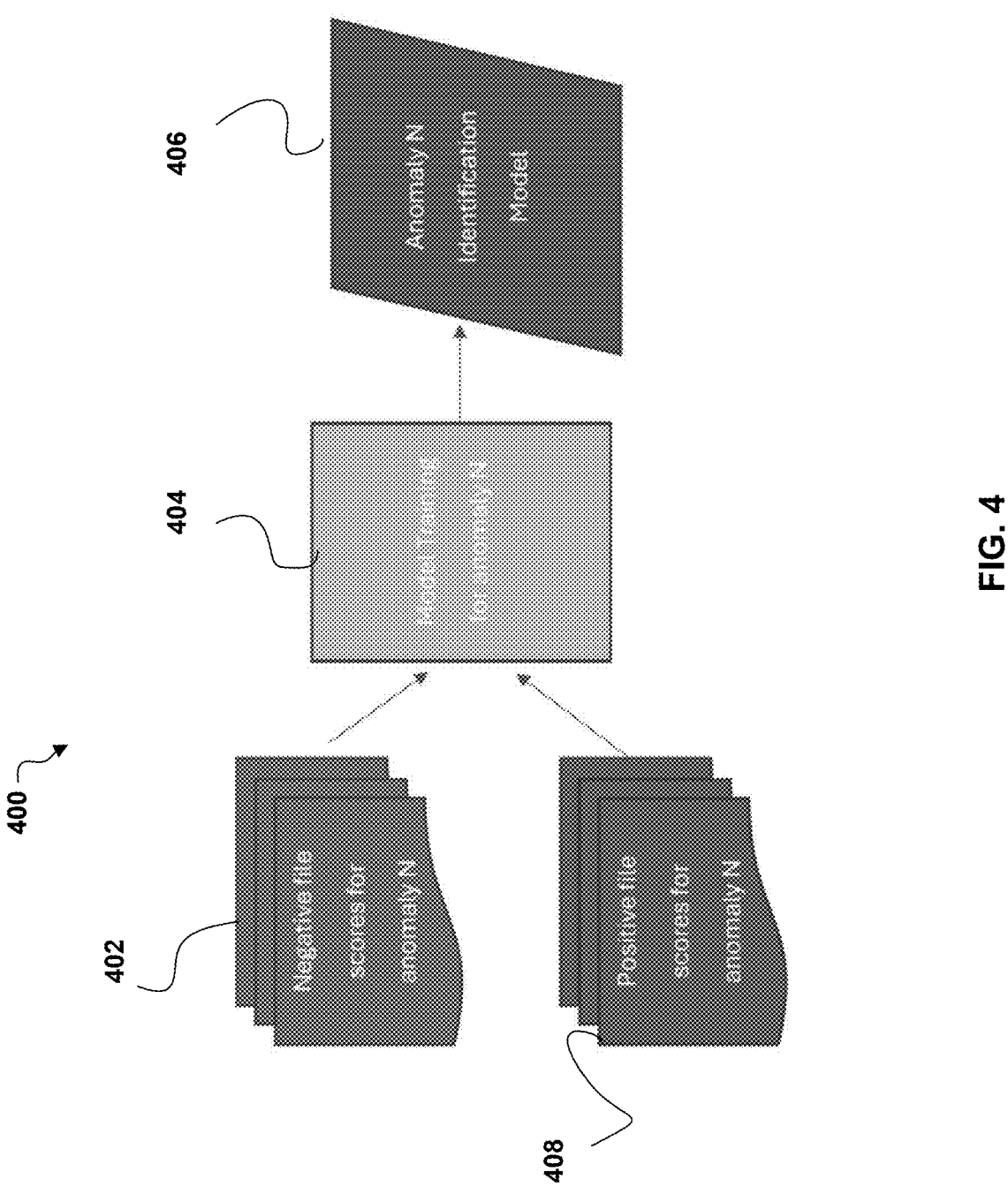
FIG. 4 is a logical flow diagram of an example of an automated process in accordance with an implementation of the present invention, for training the Anomaly Identifica-tion Model for a single kind of anomaly identifying if a file has been attacked by ransomware.

Depending on the domain and problem, typical features of file profile 306 include:
File size
Entropy
Number of white spaces
Typical features of the file score 316 include:
Percentage difference with benchmark's average size
Percentile according to file size vs benchmark
Net difference with average benchmark entropy
Anomaly Identification Model. The Anomaly Identification Model is a mechanism used in various implementations of the present invention to compute the probability that a file is normal or anomalous, according to its type. FIG. 4 is a logical diagram of an example of an automated process, in accordance with an implementation of the present invention, for training the Anomaly Identification Model 406 for a single kind of anomaly (here designated as anomaly N) identifying if a file has been attacked by ransomware. The model 406 may be the result of training algorithm 404 using as inputs negative file profiles 402 (files that are considered normal) and positive (corrupted) file profiles 408. Negative file profiles 402 and positive file profiles 408 can be synthetically generated or taken from actual normal or anomalous cases. For instance, positive profiles 408 can be the result of executing the scorer algorithm 512 on files produced by live detonation of ransomware.

Notice that it is possible to identify multiple kinds of anomalies by training multiple models.

Figure 5:
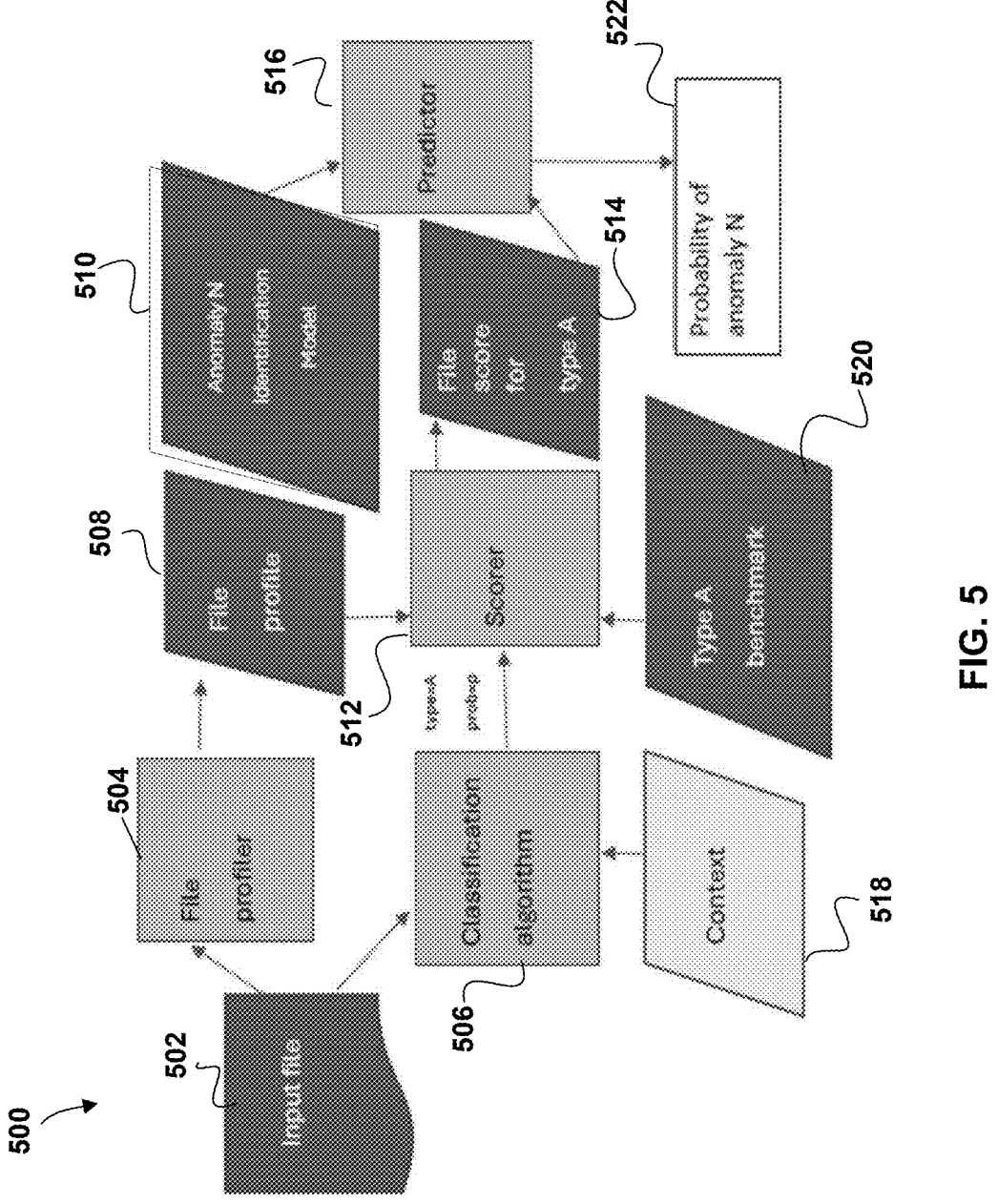
FIG. 5 is a logical flow diagram of an example of an automated process for computing the probability of a single kind of anomaly, in accordance with an implementation of the present invention.

Generating anomaly probability for a file. All the processes described above concern to a process flow that takes an arbitrary file as input and generates as an output a probability of anomaly for that file. In FIG. 5, these processes are integrated in accordance with implementations of the present invention to produce such an output based on such an input file. FIG. 5 is a logical flow diagram of an example of an automated process 500 for computing the probability of a single kind of anomaly (namely anomaly N) in an input file 502 having a single file type, namely Type A. Operation of the processes of FIG. 5 is similar to that described in connection with FIG. 3, except that here we also include the anomaly identification model 510, corresponding to the anomaly identification model 406 of FIG. 4.

Accordingly, in FIG. 5, the file profiler 504 scans the input file 502 and its metadata and computes a profile 508.

Simultaneously, the Classification algorithm 506 classifies the input file 502 and identifies it as type A, with a probability p.

The scorer 512 retrieves the benchmark 520 corresponding to the file type, and computes a score 514 for the file by comparing it against the benchmark 520 for type A.

The predictor 516 uses the score 514 produced in by the previous step, along with the pretrained Identification model 510 to generate a probability 522 for anomaly N.

Potential Applications. In general, for a given domain, the techniques described herein can be used to identify files that do not match what is considered as normal in that domain.

Embodiment 1: Automated corruption detection in a file system. The implementation described hereinafter aims at identifying corrupt files inside a file system. Corrupt files can be the result of deliberate actions such as ransomware attacks, or accidental such as physical damage to storage devices. In such cases, the integrity of some files is compromised. It might be possible to identify corrupted files using manual methods, for instance, verifying if they can be opened by their associated application. This approach is not only expensive, but also highly ineffective, since several files cannot be verified due to lack of an associated application or complex dependencies. An automated approach, on the other hand, presents an opportunity for identifying, with an elevated success rate, the files with corrupted contents.

Figure 6:
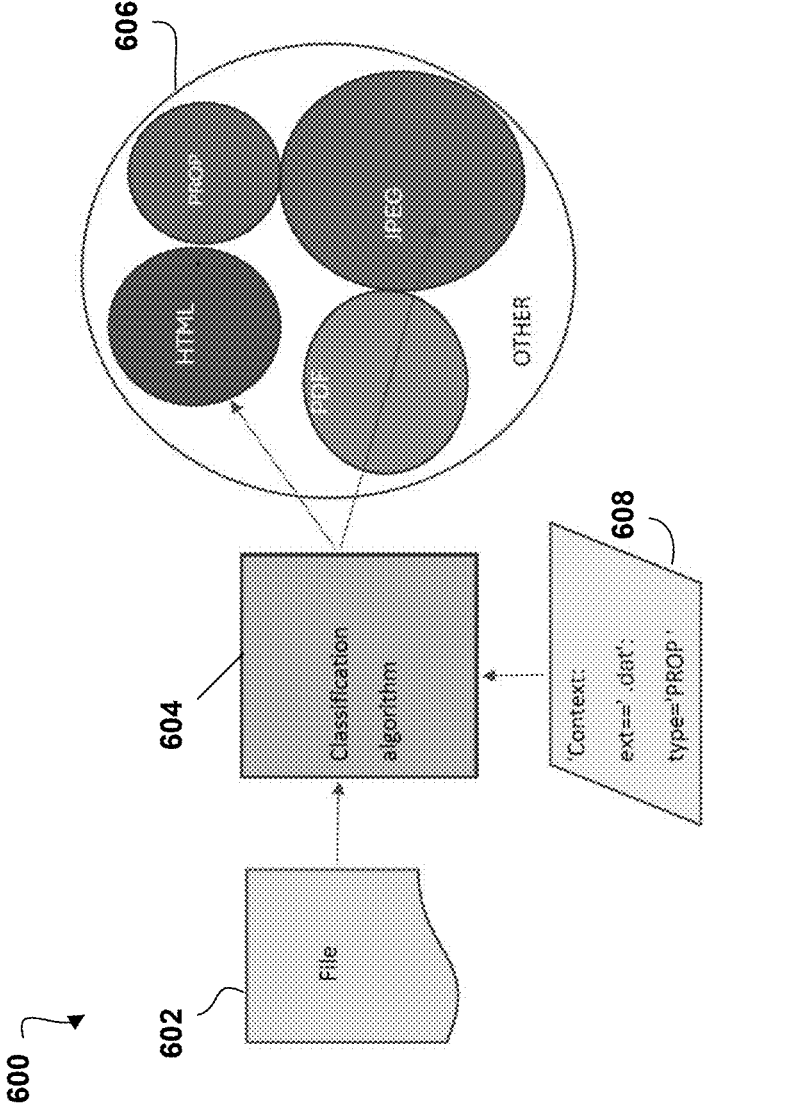
FIG. 6 is a logical flow diagram of another example of a process for classifying file types for automated corruption detection in accordance with an implementation of the present invention.

Classification of file types for automated corruption detection. A simple classification of file types starts by distinguishing text-based file types from binary ones. Common text-based file types include HTML, CSS, Javascript, log files, and the like. Common binary types include PDF, MS office, zip, rar, jpeg, and mp3. Notice that these file types may be an incomplete set and are used as an example only. FIG. 6 is a logical flow diagram of another example of a process 600 for classifying file types for automated corruption detection, in accordance with an implementation of the present invention. FIG. 6 illustrates a possible way to use a classification algorithm 604 to classify an input file 602 into types 606 for the purpose of automated corruption detection in accordance with an implementation of the present invention. The file types 606 have been defined to make it possible for an algorithm to identify them with high confidence. There is additional context 608 that is used by classification algorithm 604 to classify some files. In this example, the system has been personalized with the addition of a proprietary file type (PROP), which can be identified by using the file's extension (.dat). The file type OTHER has been defined for files that do not fall into any of the categories.

The classification algorithm 604 can use a combination of the following input data to identify a file type:

Metadata: The file extension may be a good indicator of the file type. The presence of descriptive attributes can also indicate a specific file type. For instance, storing information about the location and type of camera used for a picture is common. One implementation of a metadata-based algorithm is regular expression matching.

Partial contents: When the file extension is not known or cannot reliably identify a file's type, the algorithm 604 can inspect the file contents. It is desirable that the inspection is limited to parts of the file. A good example of such an algorithm is Linux's "file" utility, which verifies the presence of well-known byte sequences at the beginning of files (also known as magic numbers or magic bytes).

Full contents: In some cases, the system may scan the entire contents before identifying the file type 606. For example, some file formats have specific sequences to identify sections, and only by properly identifying all sections can fitness be determined. Another approach is collecting statistics on character distributions or specific byte sequences.

Context: As this example shows, the classification algorithm 604 can use context information 608 to customize its behavior for a site.

The classification algorithm 604 may use multiple criteria to make the classification. For instance, the classification algorithm 604 may use metadata to provide a preliminary file type, and the file contents to confirm it or establish a more detailed classification.

Figure 7:
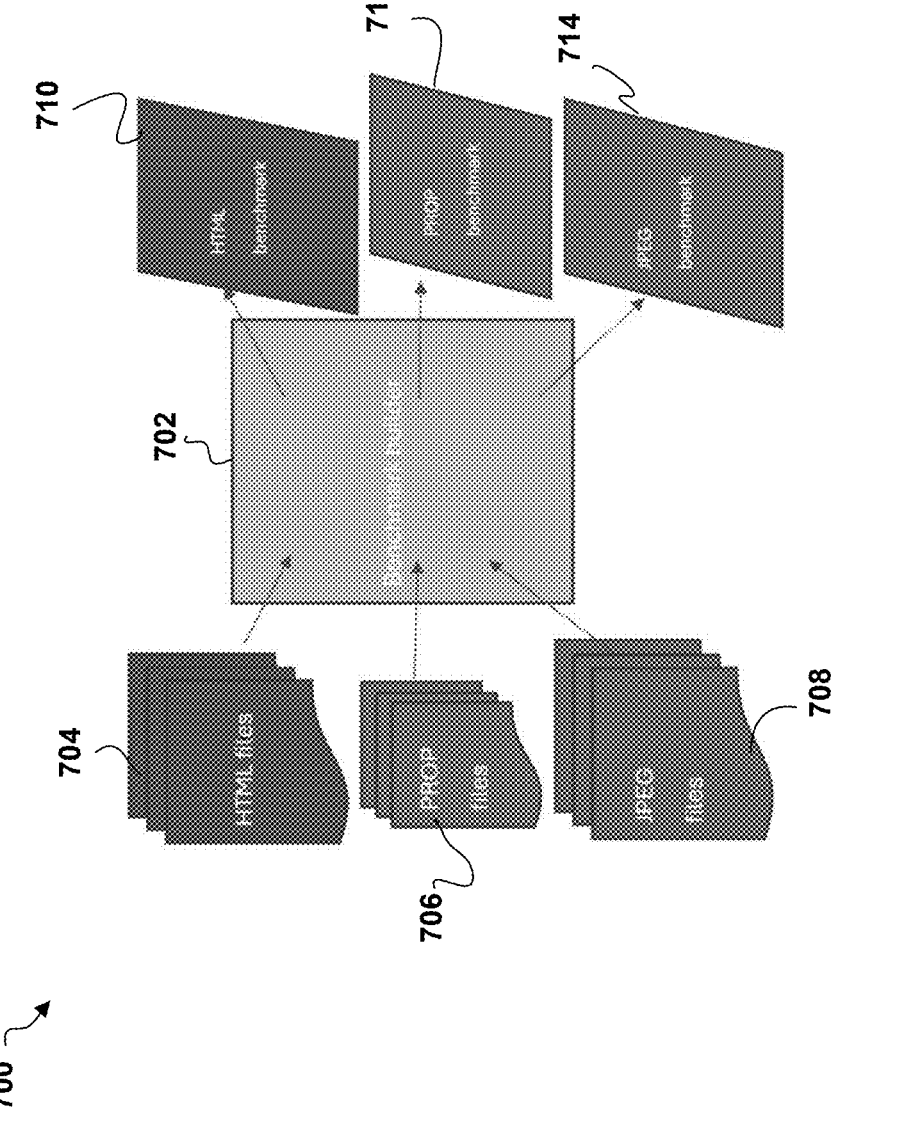
FIG. 7 is a logical flow diagram of another example of a process 700 for generating benchmark data, in accordance with an implementation of the present invention.

File type benchmarks for automated corruption detection. FIG. 7 is a logical flow diagram of an example of a process 700 for generating benchmark data for file types, for use in automated file corruption detection, in accordance with an implementation of the present invention. The benchmark builder 702 takes as input a collection of files of various types, such as HTML files 704, files of a proprietary type 706 (here called PROP files), and JPEG files 708 and, for each file type, computes a set of corresponding statistics constituting a benchmark 710, 712, and 714 for such file type. In some instances, each benchmark 710, 712, and 714 for a given file type may include metrics such as its average entropy, the most common symbol (e.g., white space), the average percentages of selected symbols (e.g., "<," ".," ">," etc.), and entropy variance, among other potential metrics. The operations performed by benchmark builder 702 are similar to those performed by benchmark builder 202 described in connection with FIG. 2.

In this example, one may build benchmarks for HTML and JPEG files using large datasets obtained from the industry. The benchmark builder 702 may create the benchmark for the proprietary file type from files taken from a customer site. The developer can run with new samples to keep the benchmarks updated or to generate customized versions for specific sites.

Figure 8:
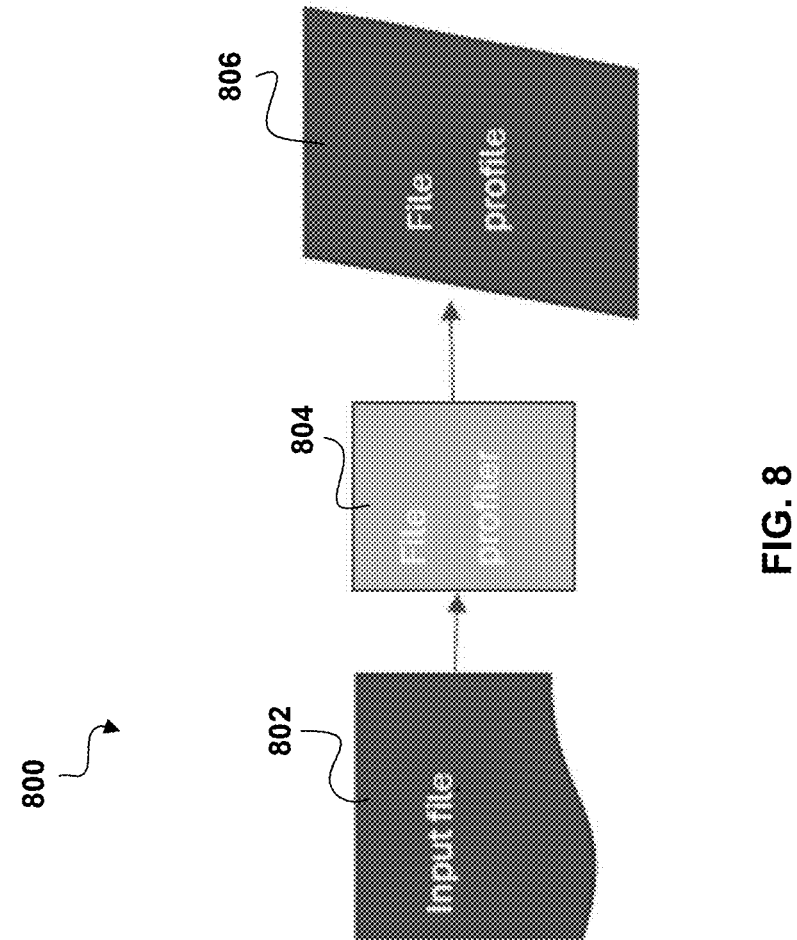
FIG. 8 is a logical flow diagram of an example of a file profiler 800, in accordance with an implementation of the present invention.

File Profiler for automated corruption detection. FIG. 8 is a logical flow diagram of an example of a process 800 employing a file profiler 804 for generating a file profile 806 from an input file 802, in accordance with an implementation of the present invention. The file profiler 804 is agnostic of the file type and performs the same calculations on all files. The file profile 806 may include the following statistics for each file: Entropy, the most common symbol, and the percentage of specific symbols (e.g., "<," ".," ">," etc.). The file profile 806 may include other statistics besides those described herein.

Additionally, as implied by the previous paragraph, file profiler 804 is used in two ways. First, it is used to compute profiles of sample files for training purposes. Secondly, it is used in production to compute the profiles of files being inspected.

Figure 9:
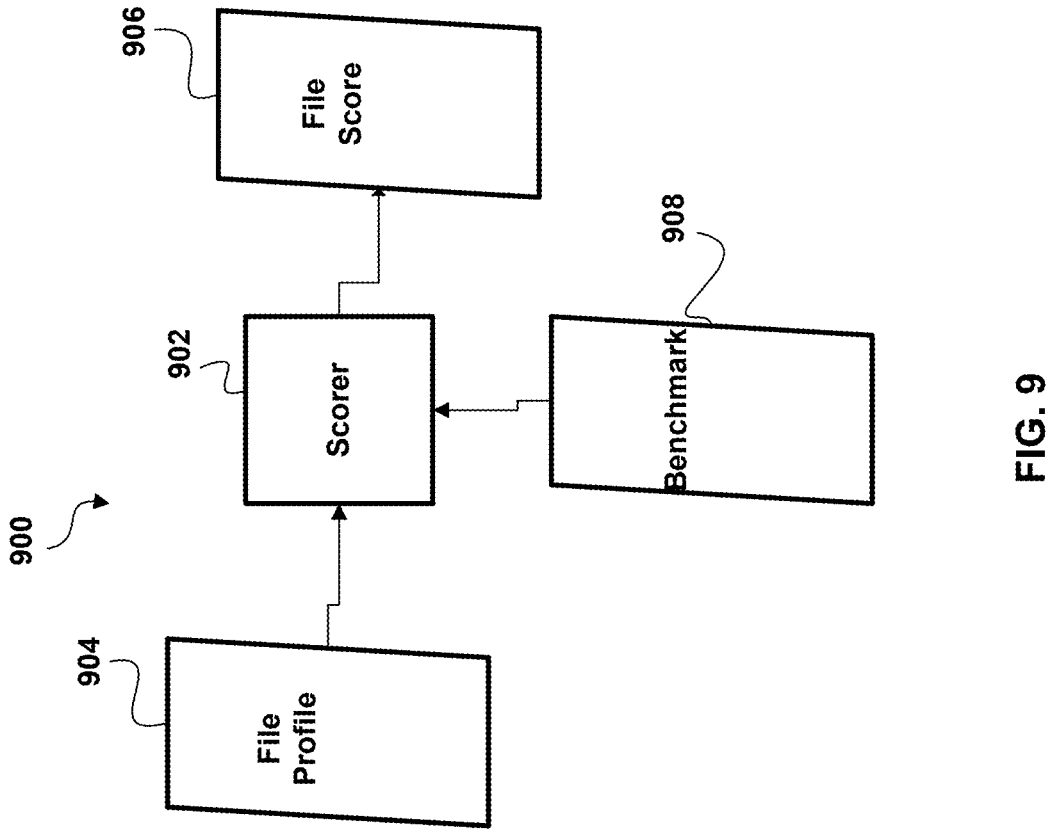
FIG. 9 is a logical flow of an example of a scorer algorithm, in accordance with an implementation of the present invention.

Scorer Algorithm. FIG. 9 is a logical flow of an example of a process 900 for generating scores, in accordance with an implementation of the present invention. FIG. 9 shows how a file score 906 is generated by the scorer algorithm 902, which takes two inputs for each file, namely: the file profile 904, and the benchmark 908. The file profile 904, which, as previously discussed, may include attributes such as entropy, most common symbol, and the frequency of occurrence of the most common symbol, has been computed by the profiler algorithm from an input file, for example, as per item 502 in FIG. 5. The benchmark 908, which may include attributes corresponding to those of the file profile, such as average entropy, most common symbol, average frequency of occurrence of most common symbol, and variance of entropy is retrieved based on the file type identified by the classifier, for example as item 506 in FIG. 5. By comparing file profile 904 with benchmark 908, the scorer algorithm 902 computes, as part of the file score 514, several values, such as:

Entropy diff: Entropy (in file profile 904) less Average entropy

Entropy % diff: (Entropy of file profile 904 less Average entropy)/(Average entropy)

MCS (Most Common Symbol) match: 1 if they are the same, 0 if not

The values in the file score 514 provide a measure of how well the input file conforms to the benchmark for the file type by which it has been classified. Those values are used as an input to the predictor 516.

Not shown here, but implicit from FIG. 8, the profiler 804 and the scorer algorithm 902 are used in two ways. The first use is for generating file scores of positive and negative samples for model training. The second use is for production, as files are being scanned.

Figure 10:
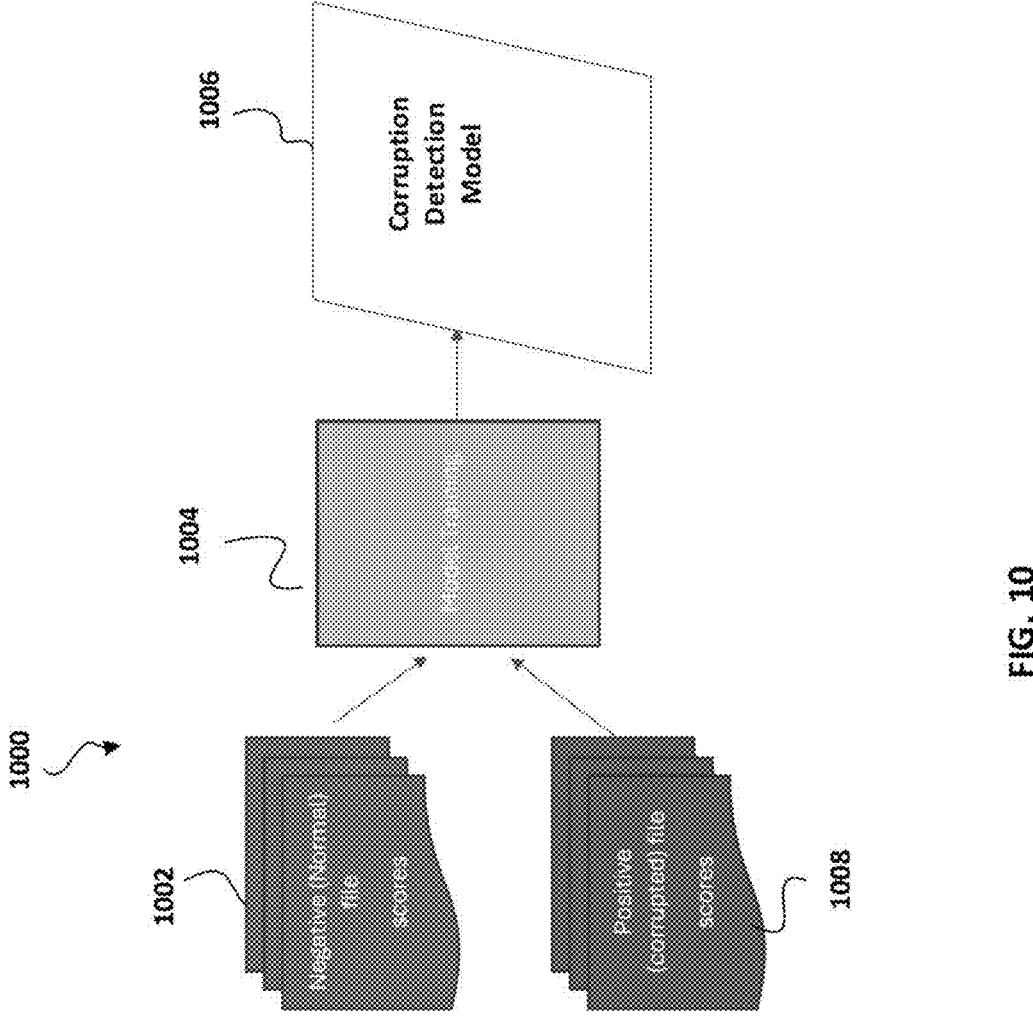
FIG. 10 is a logical flow diagram of an example of process for model training for automated corruption detection, in accordance with an implementation of the present invention.

FIG. 10 is a logical flow diagram of an example of process 1000 for model training for automated corruption detection, in accordance with an implementation of the present invention. FIG. 10 shows one of the uses of the file score 906 described in FIG. 9. Negative file scores 1002 and Positive file scores 1008 are used to train a Machine Learning Model 1006 which learns to classify files as normal or corrupted.

Negative file scores 1002 correspond to file scores computed by the scorer algorithm 902 using files deemed normal. Those files can be obtained from diverse sources, including synthetic generation, web scraping, and samples provided by a customer requiring personalization.

Positive file scores 1008 correspond to file scores from files deemed corrupt. These files can also be synthetically generated or obtained by retrieving them from post-ransomware attack environments.

The model 1006 is the result of supervised training 1004. This means that an extra feature (label) is added to all samples, indicating if they are negatives (normal) or positives (corrupted). Typical labels are 0 for negatives, and 1 for positives. The model is trained to predict both cases, which is akin to classifying any input sample as class 0 or 1.

Given that this model 1006 is tasked with classifying samples, typical classification models that can be trained 1004 include: Decision Trees, Random Forests, Neural Networks, and combinations of them with ensemble techniques such as gradient boosting.

The resulting representation of the Corruption Detection Model 1006 is particular to the model itself. In complex cases, such as neural networks, this representation includes several data structures for the network topology and the weights of all nodes. In the case of decision trees, it can be a serialized version of the tree and the values of the decision nodes as well as the probabilities of the leaves. In all cases, it is suitable to be used as input to a prediction algorithm, which can classify input file scores. The prediction algorithm typically returns probabilities for all classes (in this case 0: normal, 1: corrupted).

Figure 11:
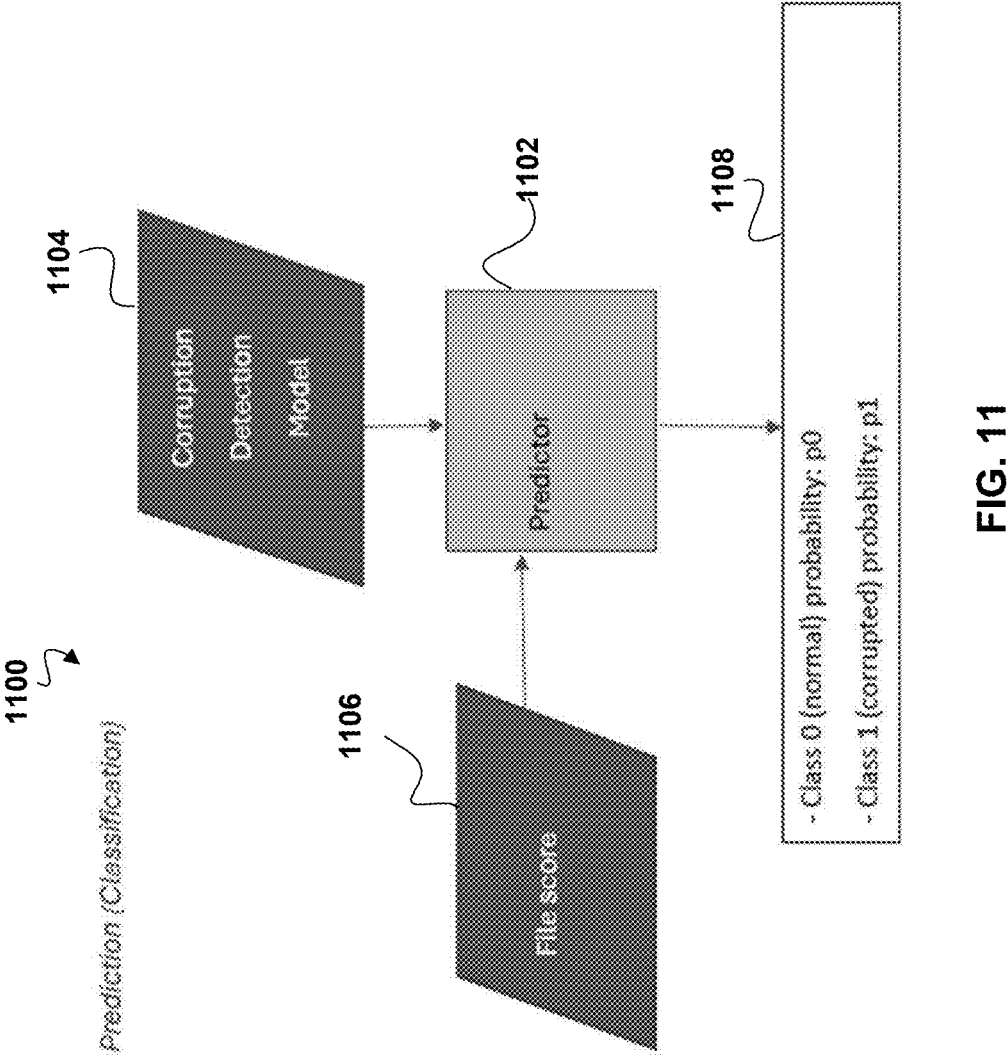
FIG. 11 is a logical flow diagram of an example of a predictor for generating the probabilities of an anomaly in a file, in accordance with an implementation of the present invention.

Prediction (classification) for automated corruption detection. FIG. 11 is a logical flow diagram of an example of a process 1100 for using a predictor 1102 to generate a probability of an anomaly in a file based on its file score 1106 as an input, in accordance with an implementation of the present invention. In this context, FIG. 11 shows the second use of file scores 1106 presented at the end of the discussion above concerning FIG. 8. In this case, there is a file system being monitored. Files in that system are inspected and classified, following the processes described above in connection with FIGS. 8 and 9. For each file, the resulting file score 1106 is sent to a predictor module 1102, which uses the corruption detection model 1104 trained as described for the model 1006 in connection with FIG. 10. The predictor 1102 generates a probability of corruption for each file based on its classification as described above. In this example, the probability is constrained either 0 (normal) or 1 (corrupt).

Figure 12:
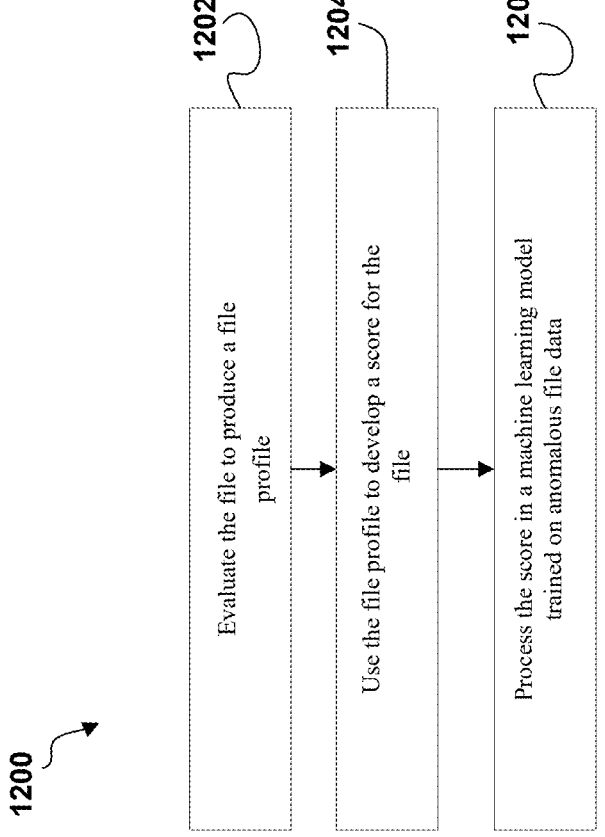
FIG. 12 is a logical flow diagram of an example of a process for detecting an anomalous file in a dataset of files, in accordance with an implementation of the present inven-tion.

FIG. 12 is a simplified logical flow diagram of an example of a process 1200 for detecting an anomalous file in a dataset of files, in accordance with an implementation of the present invention. The process 1200 may be implemented in a set of computer resources, which are optionally coupled over a network and which execute instructions that establish a set of computer processes. These computer processes include, for each file in the dataset of files, process 1202 for evaluating the file to produce a file profile. The computer processes further include process 1204 of using the resulting file profile to develop a score for the file as to its specific type. Finally, the computer processes include process 1206 by which the score is used in a machine learning model trained on anomalous file data to generate a probability that the file has an anomaly for its specific type.

In some implementations, evaluating the file in process 1202 may include producing a benchmark for the file as to its specific type. The benchmark may be selected from the group consisting of an average entropy of the file, a most common symbol in the file, average frequency of occurrence of the most common symbol in the file, an entropy variance, and combinations of the foregoing. In some implementations, process 1202 may include scanning and using metadata of the file to generate at least one metric to compare against the benchmark.

In some implementations, using the file profile to develop the score in process 1204 may include producing a collection of values from comparing the file profile and the benchmark to define the score. The score may be selected from the group consisting of a percentage difference between a size of the file and an average size of a benchmark, a percentile ranking between the size of the file and the benchmark, a difference between an entropy of the file and a benchmark entropy, and combinations of the foregoing. The machine learning model may be selected from the group consisting of a decision tree, a random forest, a neural network, a gradient boosting learning model, and combinations of the foregoing.

In some implementations, processing the score in the machine learning model in process 1206 may include processing the score trained on both files deemed normal and files deemed compromised. In some implementations, processing the score in the machine learning model in process 1206 may include determining, using the probability, whether the file has the anomaly for the specific type. In some implementations, processing the score in the machine learning model in process 1206 may include determining whether the file has been corrupted by ransomware.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific implementations, it will be understood by those skilled in the art that various changes in form and detail may be made therein without departing from the spirit and scope of the invention as defined by the appended clauses. While some of these implementations have been described in the claims by process steps, an apparatus comprising a computer with associated display capable of executing the process steps in the clams below is also included in the present invention. Likewise, a computer program product including computer executable instructions for executing the process steps in the claims below and stored on a computer readable medium is included within the present invention.

What is claimed is:

1. A computer-implemented method of detecting in a dataset of files an anomalous file that includes content that has been corrupted by a ransomware attack, the method utilizing a set of computer resources executing instructions to establish computer processes, wherein the computer processes comprise, for each given file in the dataset:

evaluating the given file to produce a file profile;

using the file profile to develop a score for the given file as a specific type by comparing the file profile against a benchmark for the specific type, wherein (i) the benchmark is a set of metrics, associated with the specific type, that uniquely identifies the given file as being of the specific type, (ii) particular constituents of the set of metrics used for determining the benchmark are selected based on a context in which the dataset of files is being used or has been generated, and (iii) the benchmark has been developed based on data for a selected collection of files of the specific file type;

processing the score in a machine learning model trained on post-ransomware attack anomalous file data to generate a probability that the given file has an anomaly for the specific type; and determining based on the probability whether the given file includes content that has been corrupted by a ransomware attack.

2. The computer-implemented method of claim 1, wherein the benchmark is selected from the group consisting of an average entropy of a file of the specific type, a most common symbol in the file of the specific type, average frequency of occurrence of the most common symbol in the file of the specific type, an entropy variance, and combinations of the foregoing.

3. The computer-implemented method of claim 2, wherein evaluating the given file comprises scanning and using metadata of the given file to generate at least one metric to compare against the benchmark.

4. The computer-implemented method of claim 3, wherein using the file profile to develop the score comprises producing a collection of values from comparing the file profile and the benchmark to define the score.

5. The computer-implemented method of claim 1, wherein the score is selected from the group consisting of a percentage difference between a size of the given file and an average size of a benchmark, a percentile ranking between the size of the given file and the benchmark, a difference between an entropy of the given file and a benchmark entropy, and combinations of the foregoing.

6. The computer-implemented method of claim 1, wherein processing the score in the machine learning model includes processing the score trained on both files deemed normal and files deemed compromised by the ransomware.

7. The computer-implemented method of claim 1, wherein processing the score in the machine learning model comprises determining, using the probability, whether the given file has the anomaly for the specific type.

8. The computer-implemented method of claim 1, wherein the machine learning model is selected from the group consisting of a decision tree, a random forest, a neural network, a gradient boosting learning model, and combinations of the foregoing.

\* \* \* \* \*